(12) United States Patent
McConnell

(10) Patent No.: US 9,836,412 B2
(45) Date of Patent: Dec. 5, 2017

(54) PROCESSOR MEMORY SYSTEM

(71) Applicant: Rambus Inc., Sunnyvale, CA (US)

(72) Inventor: Ray McConnell, Bristol (GB)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/707,166

(22) Filed: May 8, 2015

(65) Prior Publication Data
US 2015/0248353 A1  Sep. 3, 2015

Related U.S. Application Data

(63) Continuation of application No. 13/004,548, filed on Jan. 11, 2011, now Pat. No. 9,037,836, which is a
(Continued)

(30) Foreign Application Priority Data

Aug. 13, 2004 (GB) .................................. 0418177.2

(51) Int. Cl.
G06F 12/10 (2016.01)
G06F 12/109 (2016.01)
(Continued)

(52) U.S. Cl.
CPC .............. *G06F 12/109* (2013.01); *G06F 9/46* (2013.01); *G06F 11/3017* (2013.01);
(Continued)

(58) Field of Classification Search
CPC .... G06F 12/10; G06F 13/1663; G06F 12/109; G06F 15/17337
(Continued)

(56) References Cited

U.S. PATENT DOCUMENTS 5,539,898 A   7/1996  Trevett et al.
6,266,778 B1  7/2001  Bell
(Continued)

FOREIGN PATENT DOCUMENTS

GB   2203574   10/1988
GB   2348973   10/2000
(Continued)

OTHER PUBLICATIONS

Agarwal et al., "April: A Processor Architecture for Multiprocessing," Proceedings of the Annual International Symposium on Computer Architecture, Seattle, May 28-31, 1990, IEEE Comp. Soc. Press, vol. SYMP. 17, May 28, 1990, pp. 104-114. 11 pages.
(Continued)

*Primary Examiner* — Than Nguyen
(74) *Attorney, Agent, or Firm* — The Neudeck Law Firm, LLC

(57) ABSTRACT

A plurality of processing elements (PEs) include memory local to at least one of the processing elements in a data packet-switched network interconnecting the processing elements and the memory to enable any of the PEs to access the memory. The network consists of nodes arranged linearly or in a grid to connect the PEs and their local memories to a common controller. The processor performs memory accesses on data stored in the memory in response to control signals sent by the controller to the memory. The local memories share the same memory map or space. The packet-switched network supports multiple concurrent transfers between PEs and memory. Memory accesses include block and/or broadcast read and write operations, in which data can be replicated within the nodes and, according to the operation, written into the shared memory or into the local PE memory.

20 Claims, 6 Drawing Sheets

Related U.S. Application Data continuation of application No. 11/573,556, filed as application No. PCT/EP2005/008759 on Aug. 11, 2005, now Pat. No. 7,890,733.

(51) Int. Cl.
- G06F 11/30 (2006.01)
- G06F 9/46 (2006.01)
- G06F 15/173 (2006.01)
- G06F 15/80 (2006.01)

(52) U.S. Cl.
CPC .... G06F 15/17337 (2013.01); G06F 15/8015 (2013.01); G06F 2212/657 (2013.01)

(58) Field of Classification Search
USPC .................................................. 711/147, 203
See application file for complete search history.

(56) References Cited

U.S. PATENT DOCUMENTS

| | | | |
|---|---|---|---|
| 6,606,704 | B1 | 8/2003 | Adiletta et al. |
| 7,334,102 | B1* | 2/2008 | Conway .................... 711/163 |
| 7,363,472 | B2 | 4/2008 | Stuttard et al. |
| 7,668,165 | B2 | 2/2010 | Hoskote et al. |
| 2002/0169938 | A1* | 11/2002 | Scott et al. ................ 711/207 |
| 2004/0044872 | A1* | 3/2004 | Scott .......................... 711/202 |
| 2006/0069579 | A1* | 3/2006 | Grass et al. ................... 705/1 |
| 2006/0179255 | A1* | 8/2006 | Yamazaki .................. 711/147 |

FOREIGN PATENT DOCUMENTS

| | | |
|---|---|---|
| GB | 2348984 | 10/2000 |
| GB | 2348974 | 5/2004 |
| GB | 2394815 | 8/2004 |
| GB | 2390506 | 3/2005 |
| GB | 2407179 | 4/2005 |

OTHER PUBLICATIONS

Baglietto et al., "Data Movement by Packet Switching Communication on Reconfigurable Processor Arrays," Parallel Computing: State-of-the-Art and Perspectives 1996 Elsevier, Amsterdam, Netherlands, Proceedings of ParCo 95, Parallel Computing 95: State of the Art Prespectives, Sep. 19-22, 1995. 8 pages.

Bhuyan et al., "Performance of Multistage Bus Networks for a Distributed Shared Memory Multiprocessor," IEEE Transactions on Parallel and Distributed Systems, IEEE Service Center, Los Alamitos, CA, vol. 8, No. 1, Jan. 1997, pp. 82-95. 14 pages.

Culler et al., "Parallel Computer Architecture—A Hardware/Software Approach," 1999, Morgan Kaufmann, San Francisco, pp. 453-459, 473-476, 506-511. 17 pages.

GB Examination Report dated Aug. 10, 2007 in GB Application No. 0418177.2. 3 pages.

GB Response to Search Report and Examination Opinion dated Jan. 5, 2005, dated Sep. 27, 2005 in GB Application No. 0418177.2. 11 pages.

GB Search Report and Examination Opinion dated Jan. 5, 2005 in GB Application No. 0418177.2. 4 pages.

International Preliminary Report on Patentability dated Dec. 8, 2006 in International Application No. PCT/EP2005/008759. 20 pages.

International Search Report and Written Opinion dated Aug. 11, 2006 in International Application No. PCT/EP2005/008759. 24 pages.

Jantsch et al., "Networks on Chip," Kluwer Academic Publishers, Dordrecth, NL, Chapter 9, 2003. 22 pages.

Jesshope et al., "Design of SIMD Microprocessor Array," IEEE Proceedings E. Computers & Digital Techniques, Institution of Electrical Engineers, vol. 136, No. 3, Part E, May 1, 1989, pp. 197-204. 8 pages.

Moona et al., "A Software Environment for General Purpose MIMD Multiprocessors," Information Technologies for the Nineties—E2C2, Energy, Electronics, Computers, Communications, Bombay, Nov. 22-24, 1989, Proceedings of the Region Ten International Conference (TENCON), New York, IEEE. 4 pages.

Parcerisa et al., "Efficient Interconnects for Clustered Microarchitectures", 2002 International Conference on Parallel Architectures and Compilation Techniques (PACT-2002), IEEE, 108--795x/02, pp. 291-300, Sep. 2002. 10 pages.

Rathi et al., "Specification and Implementation of an Integrated Packet Communication Facility for an Array Computer," Proceedings of the International Conference on Parallel Processing, Aug. 23-26, 1983, Silver Spring, IEEE Comp. Soc. Press, Aug. 1983, pp. 51-58. 8 pages.

Sankaralingam et al., "Exploiting ILP, TLP and DLP with the Polymorphous TRIPS Architectures," 30th Annual International Symposium on Computer Architecture (ISCA), Jun. 2003. 12 pages.

Sankaralingam et al., "Routed Inter-ALU Networks for ILP Scalability and Performance," 21st International Conference on Computer Design (ICCD), IEEE, 1063-6404/03. 8 pages.

Siegel et al., "PASM: A Partitionable SIMD/MIND System for Image Processing and Pattern Recognition," IEEE Transactions on Computers, IEEE Service Center, Los Alamitos, CA, vol. C-30, No. 2, Dec. 1981, pp. 934-947. 14 pages.

Siegel, Howard Jay, "Interconnection Networks for SIMD Machines," IEEE Transactions on Computers, vol. 12, No. 6, Jun. 1979, pp. 57-65. 9 pages.

Siegel, Howard Jay, "A Model of SIMD Machines and a Comparison of Various Interconnection Networks," IEEE Transactions on Computers, vol. c-28, No. 12, Dec. 1979, pp. 907-917. 11 pages.

Ungerer et al., "A Survey of Processors with Explicit Multithreading," ACM Computing Surveys, ACM, New York, NY, vol. 35, No. 1, Mar. 2003, pp. 29-63. 35 pages.

Vranesic et al., "Hector: A Hierarchically Structured Shared-Memory Multiprocessor," Computer, IEEE Service Center, Los Alamitos, CA, vol. 24, No. 1, Jan. 1991, pp. 72-78. 7 pages.

\* cited by examiner

PROCESSOR MEMORY SYSTEM

CROSS-REFERENCE TO RELATED APPLICATIONS

This application is a continuation of U.S. patent Ser. No. 13/004,548, filed Jan. 11, 2011, which is currently allowed, which is a continuation of U.S. patent Ser. No. 11/573,556, filed Sep. 20, 2008, now U.S. Pat. No. 7,890,733, which is a §371 of international application PCT/EP2005/008759, filed Aug. 11, 2005, which claims priority under 35 U.S.C. §119 to Great Britain Patent Application No. 0418177.2, filed on Aug. 13, 2004, each of which is hereby incorporated herein by reference in its entirety.

BACKGROUND OF THE INVENTION

The present invention concerns processor (e.g. data processor) systems with enhanced inter-communication and memory arrangements.

Current implementations of SIMD processors have local memory for each processing element (PE). This memory is normally private to each PE. In order to share data, the PEs either have to access data in a common shared memory or use some sort of inter-PE communication mechanism. Having two different types of memory complicates the programming model. Having to move data to shared memory, or between PEs, is a performance overhead.

The object of the present invention is to overcome these and other problems.

Prior Art

Various classes of architecture, including SIMD architectures with shared memory are already known. Two Types in particular are worth referring to:

Distributed memory systems: In this case each PE has its own associated memory. The PEs are connected by some network and may exchange data between their respective memories when required. In contrast to shared memory machines (see below) the user must be aware of the location of the data in the local memories and will have to move or distribute these data explicitly when needed. Our previous architecture (and most SIMD architectures) are of this form.

Shared memory systems: Shared memory systems have multiple PEs, all of which share the same address space. This means that the knowledge of where data is stored is of no concern to the user as there is only one memory accessed by all PEs on an equal basis. Single-CPU vector processors can also be regarded as an example of this.

The following papers describe routed inter-ALU networks, which are interconnects for distributing instructions to distributed ALUs and data to and from register files:

"Efficient Interconnects for Clustered Microarchitectures"; Joan-Manuel Parcerisa, Julio Sahuquillo, Antonio Gonzalez, and Jose Duato "Routed Inter-ALU Networks for ILP Scalability and Performance"; Karthikeyan Sankaralingam, Vincent Ajay Singh, Stephen W. Keckler, and Doug Burger, Computer Architecture and Technology Laboratory, Department of Computer Sciences, Department of Electrical and Computer Engineering, The University of Texas at Austin "Exploiting ILP, TLP, and DLP with the Polymorphous TRIPS Architecture"; Karthikeyan Sankaralingam, Ramadass Nagarajan, Haiming Liu; Changkyu Kim, Jaehyuk Huh, Doug Burger, Stephen W. Keckler, Charles R. Moore, Computer Architecture and Technology Laboratory, Department of Computer Sciences, The University of Texas at Austin.

Such networks connect a number of function units together via a distributed register file. Inter function unit and register file operations use this network to steer source and destinations of data driven by the instruction command. Thus the network ties the function units of a clustered ALU processor together, connecting function units to register files.

This approach differs from that described here, in that there is no distribution of instructions or connection of function units to register files with Applicant's ClearConnect Bus ("CCB") network. Also the source and destination addresses are driven by the ALU and not statically by an instruction stream.

Certain problems with previous implementations of shared memory SIMD can be identified as follows, in that they:

require complex and non-scalable cross-bar or multi-port memory systems;

use central arbitration of accesses to memory, adding delay and complexity;

often limit the types of access allowed: e.g. all PEs access a fixed offset.

Reference may be made to some of our earlier patents and patent applications for further background and information concerning certain aspects of features of the present invention:

UK patents 2348974 (load/store), 2348984 (multitasking), 2348973 (scoreboarding)

UK patent applications: 0321186.9 (ClearConnect), 0400893.4 (multitasking), 0409815.3 (unified SIMD).

SUMMARY OF THE INVENTION

In its preferred implementation and in order to address the above problems, the invention provides shared PE memory with a single uniform address space that includes all the local memories of the PEs as well as the global shared memory.

The invention simplifies inter-processor communications within a SIMD array and also unifies mono and poly memory into a single address space. This greatly simplifies memory usage for the programmer and expands the potential for compiler optimisation. It also combines the performance benefits of local PE memory and the ease of use of shared memory. The invention also increases the efficiency of operation of a SIMD processor when inter-PE communications and computation are mixed within a program.

The invention therefore provides a data processor comprising a plurality of processing elements, memory means local to at least one of said plurality of processing elements, and a data packet-switched network interconnecting said processing elements and said memory means, whereby to enable any of said processing elements to access the memory means.

In preferred implementations of the invention: The memory means comprises local memory associated with a respective one of each of said processing elements, one processing element per local memory. Each processing element may be one of an array of processing elements in an array processor.

The processor array may be a single instruction multiple data (SIMD) processor. The memory means may comprise a single local memory shared between a plurality of processing elements.

External memory may also be connected to the data packet-switched network such that the external memory is available to any of the said processing elements.

The packet-switched network preferably comprises a plurality of nodes, each node connected to a respective processing element and at least one node connected to said memory means.

The nodes may be connected in a linear network or in an array to form a grid. The packet-switched network is preferably adapted to support multiple concurrent transfers between said processing elements and said memory means.

The nodes are preferably connected to a common controller adapted to issue instructions to said processing elements and to issue memory control signals to said memory means, in which case further means such as respective OR-gates combine status signals from each processing element and combine status signals from each node for communication to the common control.

One of said nodes in said packet-switched network is adapted to act as an interface between any of said nodes and said external memory.

The memory means may comprise a plurality of instances of said local memory, all of said instances appearing in a single memory map or memory space for access by any of the processing elements.

The external memory preferably also appears in said single memory map or memory space for access by any of the processing elements.

The data processor may additionally, comprise at least one further data processor, each said further data processor having respective memory means, and wherein each, said respective memory means appears in the same memory map or memory space as said memory means of said data processor.

The memory means are preferably mapped into contiguous address ranges in said memory map or memory space or may alternatively be mapped into non-contiguous address ranges in said memory map or memory space such that each processing element appears to have more local memory than is physically associated with it, the additional memory being provided by addresses in said external memory.

Each address in said memory map or memory space is preferably determined by combining at least an identification number of a respective processing element and an address within a respective local memory. Where the data processor is attached to one or more further data processors, the address preferably also includes a processor identity number.

Preferably, at least part of said memory means further comprises cache memory also connected to the data packet-switched network such that the cache memory is available to any of the said processing elements.

The processor is preferably adapted to execute one or more instructions during the time that at least one other instruction is completing, whereby the variable latency of memory accesses is hidden.

The common controller may be adapted to perform memory access operations concurrently and independently of other operations.

The processor may perform a memory access on data stored in said memory means, in response to control signals sent by said common controller to said memory means, said memory access being enabled only in respect of a block of said memory means that has received a transaction from a corresponding node.

Each processing element may set and maintain a flag indicating that the processing element is involved in a memory access, the said status signal being generated from the flag and communicated to the common controller, and the flag being cleared when the memory access is completed.

Similarly, each node may set and maintain a flag indicating that the node is involved in a transaction, the said status signal being generated from the flag and communicated to the common controller, and the flag being cleared when the transaction is completed.

The data processor may issue said control signals to perform a said memory access once per cycle of a system clock.

The processor may wait until each transaction packet has reached its target memory before cycling said memory control signals once or may wait until every transaction packet has reached its target memory before cycling said memory control signals once.

The processor may batch a plurality of memory accesses and perform said batch of memory accesses simultaneously.

The memory access may be a posted write operation in which the processing elements do not wait for acknowledgment that the write transaction has completed. The memory access may be an acknowledged write operation in which an acknowledgement packet is generated in response to completion of the write operation and returned to a requesting processing element.

The memory access may be a broadcast read operation in which a read transaction is initiated from a transaction-enabled processing element, data is read from a memory location, replicated at each node and entered in a register file in each processing element.

The memory access may be a block write operation in which each processing element is adapted to generate a sequence of write operations in response to generation by the common controller of a block copy command containing a memory address and a count, thereby enabling all the write operations in the block to be completed.

The memory access may be a block read operation in which each processing element is adapted to generate a sequence of read operations in response to generation by the common controller of a block read command containing a memory address and a count, thereby enabling all the read operations in the block to be completed.

The memory access may be a broadcast write in-which a write transaction is initiated from a transaction-enabled processing element, data is replicated at each node and is copied into the local memory of each processing element.

BRIEF DESCRIPTION OF THE DRAWINGS

The invention will now be described with reference to the following drawings, in which.

and

Figure 10:
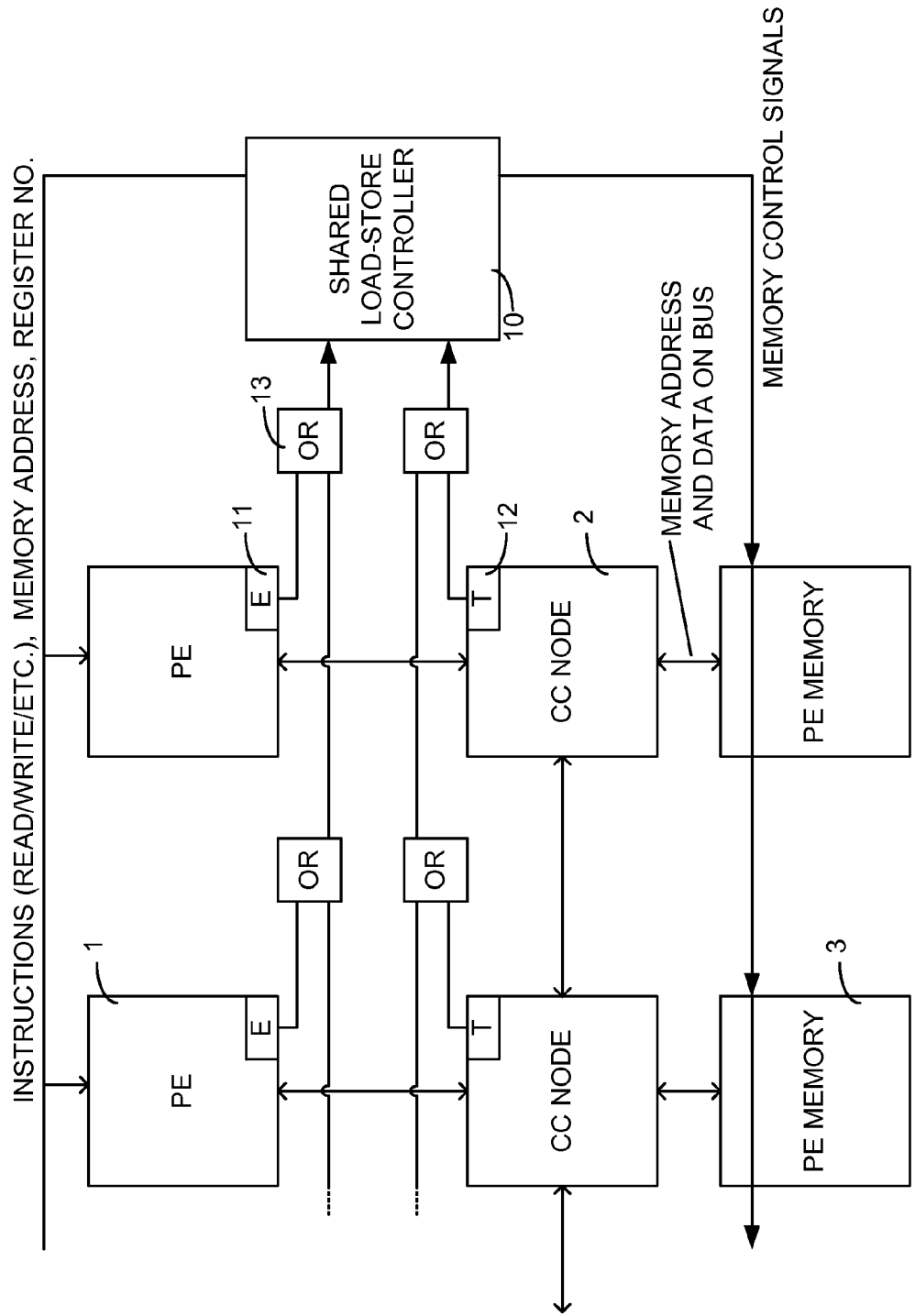

FIG. 10 illustrates a shared load/store unit used in conjunction with the memory arrangement according to the invention.

DETAILED DESCRIPTION OF THE INVENTION

General

The invention as preferably implemented connects the memory elements associated with each SIMD processor element (PE) so that all memory elements in the entire system (including external memory) can be accessed in a natural and consistent manner whilst maximising available memory bandwidths and processor performance. Although networks connecting PEs in a processor array are not new per se, this invention has several advanced features that make it unique.

The intimate combination of a bidirectional packet steered network with a load store memory controller provides a Classical memory to register-file processor model, with all the complexities of inter-PE, and even inter-processor, communication hidden from the programmer. Computational inefficiencies associated with the potentially large latencies of these transfers are hidden by use of multi-threaded capabilities of the processor. Thus the invention makes it easier for a compiler to optimise an application due to the classical memory to register-file processor model. The programmer is thus relieved of the responsibility of explicit data movement with the system.

The invention makes full use of as much parallelism and bandwidth as is available in the hardware. Large numbers of concurrent memory operations are able to execute due to the segmented and non-blocking structure of the switched network.

The invention allows the expansion of the memory system beyond internal resources. The addresses used to steer the transactions within the network are also the same address used in the global memory map.

Because of the simplicity of the invention and the features listed above, the invention makes it straightforward for a software application to gain efficient use of resources.

This is applicable to any SIMD processor and potentially any type of array of processing elements (or processors).

Detail

Figure 1:
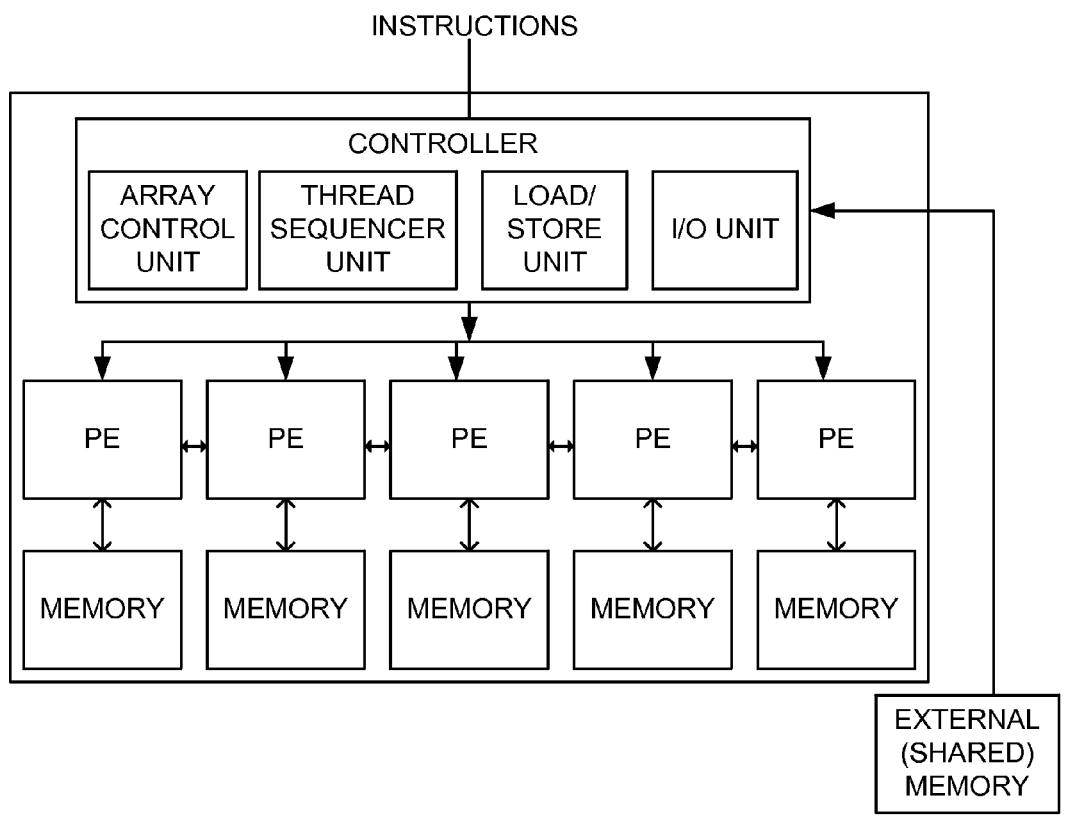
FIG. 1 illustrates a traditional SIMD architecture.

A current SIMD processor is illustrated schematically in FIG. 1. This has an array of PEs each with associated memory. There is also a controller which fetches instructions and issues them to the PE array. The controller is logically subdivided into a number of units for managing the execution of different types of instructions. For example, the array control unit issues the instructions which are executed entirely within the PE such as arithmetic and logic operations, program control, and the movement of data between registers. The load/store (LS) unit issues instructions for moving data between PEs and their memories. The Input/Output (I/O) unit issues instructions for moving data on and off the processor. Each of these units uses different hardware within the PE array and so the operations controlled by each unit can execute concurrently.

Figure 2:
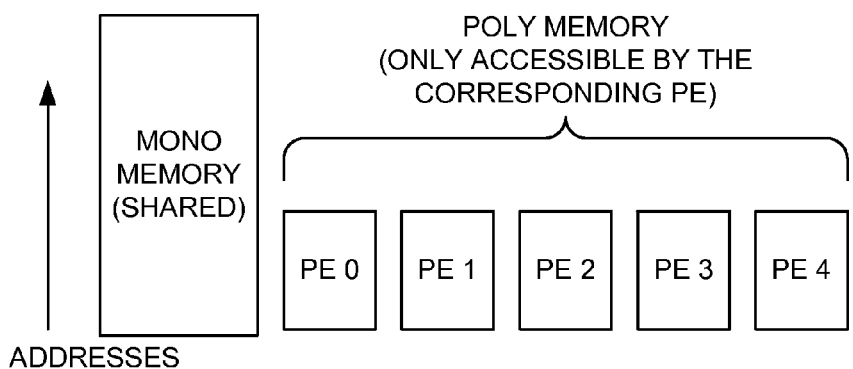
FIG. 2 illustrates schematically separate poly and mono memory maps.

Typically, current SIMD architectures provide memory associated with each PE, as illustrated diagrammatically in FIG. 1. This means that there are separate address spaces for external/shared memory ("mono" memory) and for each PE memory ("poly" memory). This is represented by the memory map in FIG. 2.

In the current state of the art, the local memory associated with a PE has to be managed directly by the programmer if data is to be either shared with other PEs or moved to/from external memory. Data has to be explicitly transferred to/from workspace locations within the memory associated with each PE. This memory map is privately owned by the PE and is not visible to any other entity. This burdens the programmer with the explicit management of moving data between these separate spaces.

Figure 3:
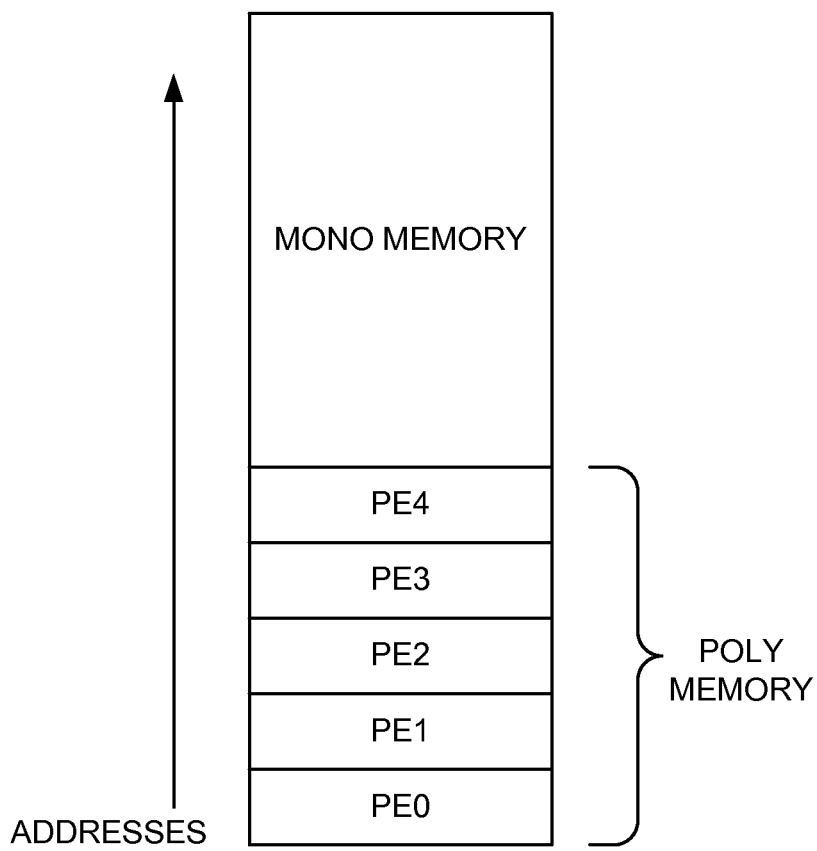
FIG. 3 illustrates schematically an address map for unified memory, showing how to generate shared memory address from PE id and memory address for an example of 2 K word memory (11 bit addresses) and 64 PEs (6 bit PE number)

The invention enables access to the memory of other PEs by mapping all of the PEs' memories into a single address space as uniquely addressable ranges, as illustrated in FIG. 3. When data needs to be moved between PEs within the array, a straightforward memory copy operation is used.

Figure 4:
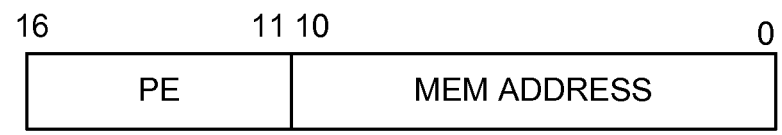
FIG. 4 shows how to generate shared memory address from PE id and memory address.

In the simplest case, the memory address used to access PE memory is a concatenation of the id number of the PE holding the data (the left hand side of FIG. 4) and an address in that PE's memory (the right hand side of FIG. 4). As shown in the Figure, this maps all PE memories into contiguous blocks in the address space. However, this simple model assumes that the PE memory size is a power of 2. Thus, a compiler can naturally communicate data between PEs and external memory without explicit use of data movement instruction sequences. All this can be implemented using conventional C syntax. The programmer can use these features without knowing that the mechanism actually exists or how it is implemented.

Figure 5:
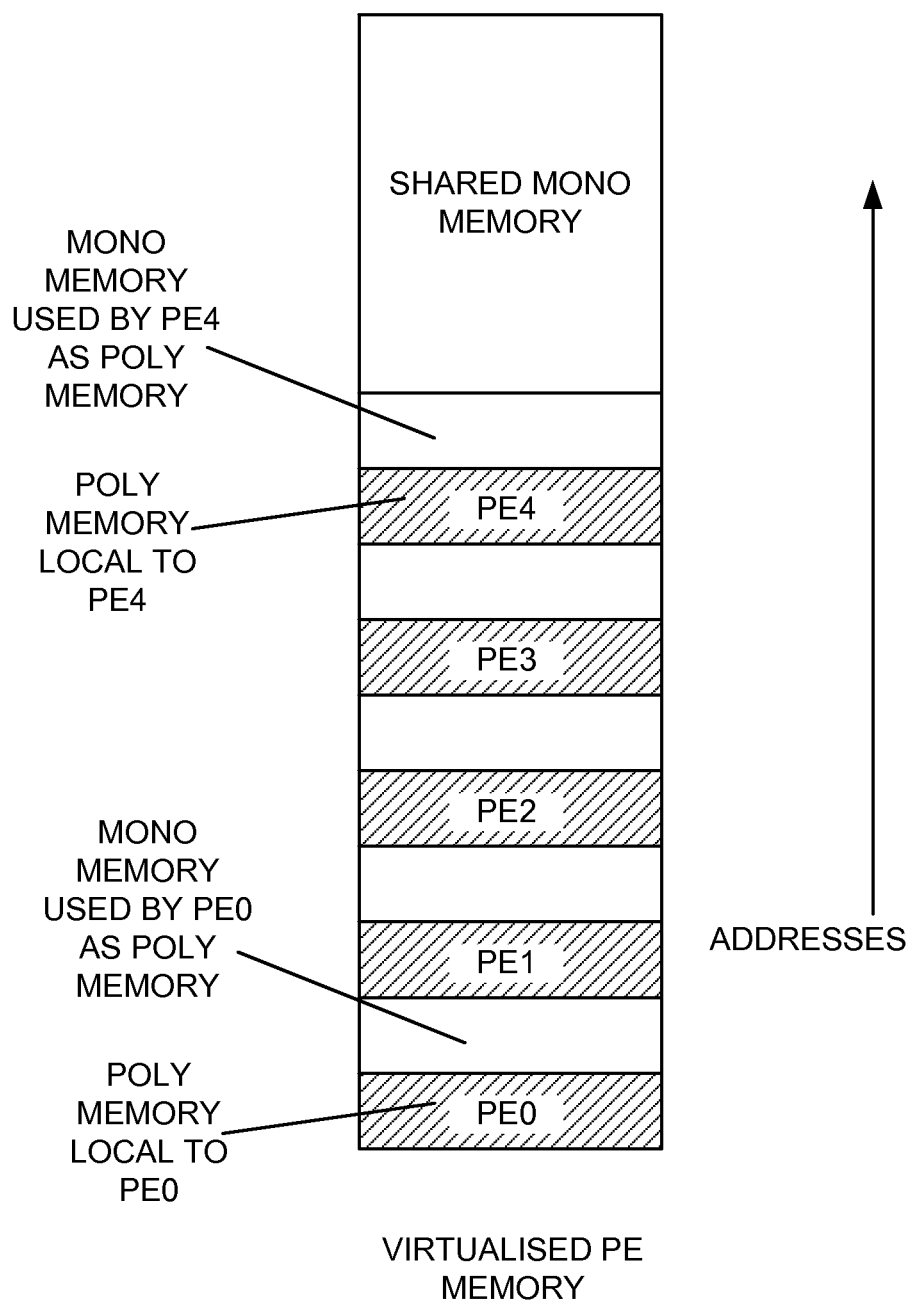
FIG. 5 illustrates an address map for virtualised PE memory.

More sophisticated memory mapping can be used so that the blocks of PE memory are not contiguous, or to handle memory sizes which are not a power of 2. This can effectively 'virtualise' the PE memory by allowing each PE to access addresses beyond the range of its physical local memory—such accesses will go to a global memory, but to an area which is treated as if it were private to that PE, as illustrated in FIG. 5. The only difference, from the PE's perspective, is that accesses to addresses which correspond to the memory local to the PE will be faster.

Other address mappings can be used. For example, it may be useful in vector processing to interleave words from the memory of each PE. If there are N PEs, each with associated memory, then the first N words in the memory map would correspond to the first word from each of the respective PEs, the second N words would correspond to the second word from each PE, etc. Variations on this idea can be useful in DSP or image processing applications, especially if the mapping can be changed dynamically, for example generating "butterfly" addresses for FFTs.

Implementation

Figure 6:
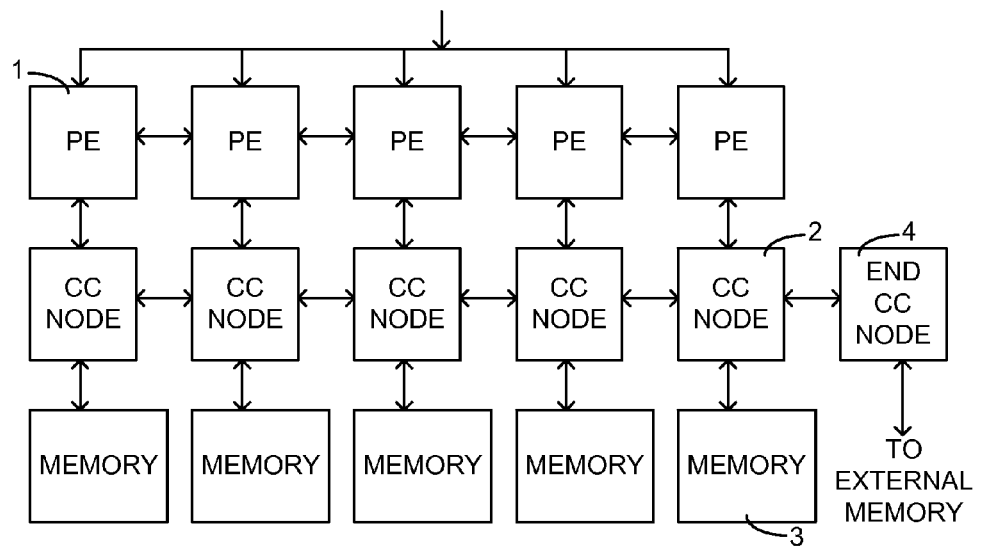
FIG. 6 is a schematic diagram of a CCB interconnecting PE memories.

The preferred implementation of the invention as represented in FIG. 6 uses a bi-directional ClearConnect "bus" (CCB). However, rather than simply being a "bus" in the accepted sense of the word, the bus is in reality a data packet switched interconnection network. Further details of the ClearConnect Bus can be had by reference to our UK Patent Application 0321186.9 (UK Patent No 2348974). Spaced along the "bus" are nodes 2 such that every PE 1 can be connected to its corresponding block of memory 3 and to every other memory block, whether the memory block of another PE or another memory altogether. Nodes 4 at the end of the CCB connect to external interfaces or another CCB network. The overall structure is shown in FIG. 6.

The features of the ClearConnect bus that make it particularly well suited to this application are: It is modular and scalable to any number of nodes;

All address decoding, routing, arbitration and control is distributed, performed locally and independently at each node;

The modular structure allows multiple concurrent transfers to occur on each bus segment;

In addition, within each node, each route through the node can support concurrent transfers;

The bus is non-blocking; buffering can be included at each node to ensure that it is always ready to accept data;

There is guaranteed delivery: once a data packet has been sent, the sender can be sure it will (eventually) arrive at the destination.

Figure 7:
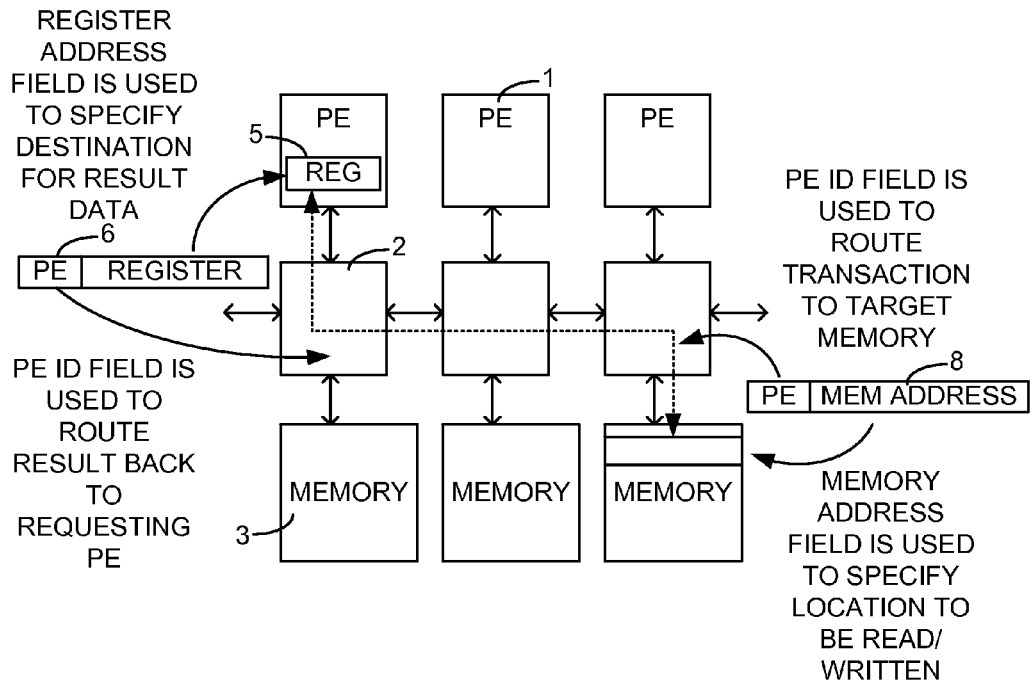
FIG. 7 illustrates the operation of inter-PE transfers, routing requests between PE registers and memory.

Because of the modular nature of the CCB and its support for multiple independent concurrent transactions, all PEs can still access their own memory with no contention. However, this architecture enables every PE1 to access the memory 3 of every other PE, although with greater latency. Memory accesses are routed to/from the appropriate location of the appropriate PE and the register file 5 of the requesting PE unit, as shown diagrammatically in FIG. 7. The register address field is used to specify the destination for the result data and the PE id field is used to route the result back to the requesting PE. The two fields are indicated together at 6 in FIG. 7. Similarly, the PE id field is used to route the transaction to the target memory and the memory address field is used to specify the location to be read/written as the case may be. This is shown collectively at 8 in FIG. 7. A representative transaction between PEs is indicated by the broken line linking the top left PE with the bottom right memory via the three nodes 2, as shown in FIG. 7.

Figure 8:
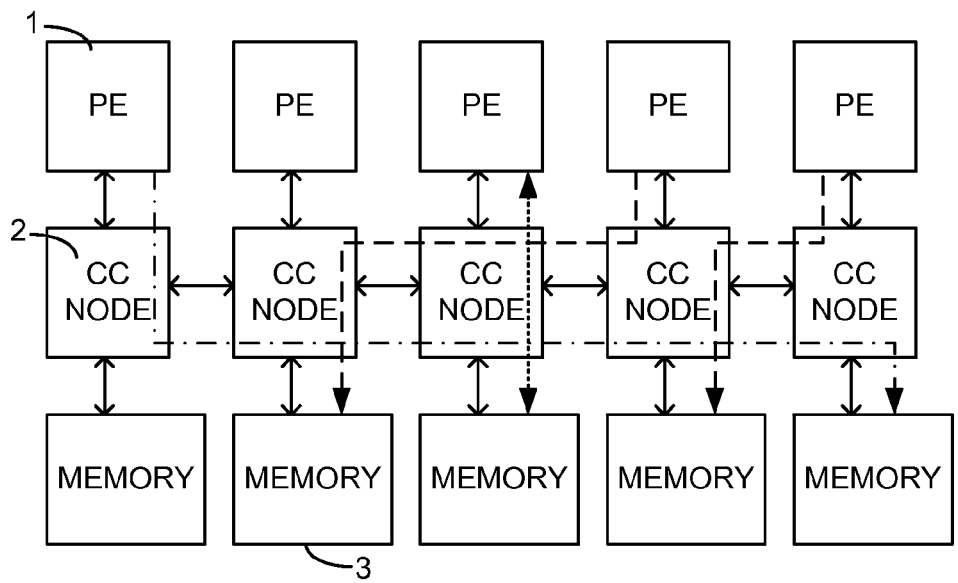
FIG. 8 illustrates the operation of Concurrent transfers.

Another benefit of using the ClearConneet bus is that the bandwidth between, PE memories and register files is maximised due to the highly concurrent nature of the bus, as also illustrated diagrammatically in FIG. 8. A variety of exemplary transactions between PEs and PE memory are shown for illustrative purposes in FIG. 8 using a variety of different broken/chain dotted lines.

Data is buffered in the ClearConnect Node 2 before being written to memory 3. Sufficient buffering here ensures that the bus will not stall when multiple transactions are addressed to a single memory. This buffering can also be used to synchronize the memory transfers at every node; this allows the memory transfer to take a single cycle instead of being spread out over several cycles as each node performs its own write. The memory transfer can then 'cycle steal'; ie. take place when the memory is otherwise idle. The same thing can be done when data is returned to PE registers. This detail is omitted from the description below, for simplicity.

As an alternative to the nodes being cascaded in a chain, they may be arranged in a grid. The physical arrangement is immaterial to the processor provided the nodes can still operate in the manner just described for the cascaded arrangement.

Because of the longer latency of transfers to distant blocks of memory, a modified load/store unit, the shared load-store (SLS) unit, is provided that handles these concurrently and independently of other PE operations. This also allows PE execution to continue whilst these memory operations are in progress, with the SLS unit arbitrating for access to PE memory. Note that the mechanism here could replace the existing load/store mechanism for each PE to its local memory or could be used in addition to it; the latter allows both load/store mechanisms to be used concurrently.

The processor can execute instructions from other threads while inter-PE and other non-local transfers are taking place. In a multi-tasking implementation it may not be efficient to switch to a new thread for the duration of the transfer. However, the compiler can schedule the transfer such that there are other instructions that can be executed from the same thread while it is taking place. In an SMT implementation, instructions from any available thread can be run while the transfer takes place.

Figure 9:
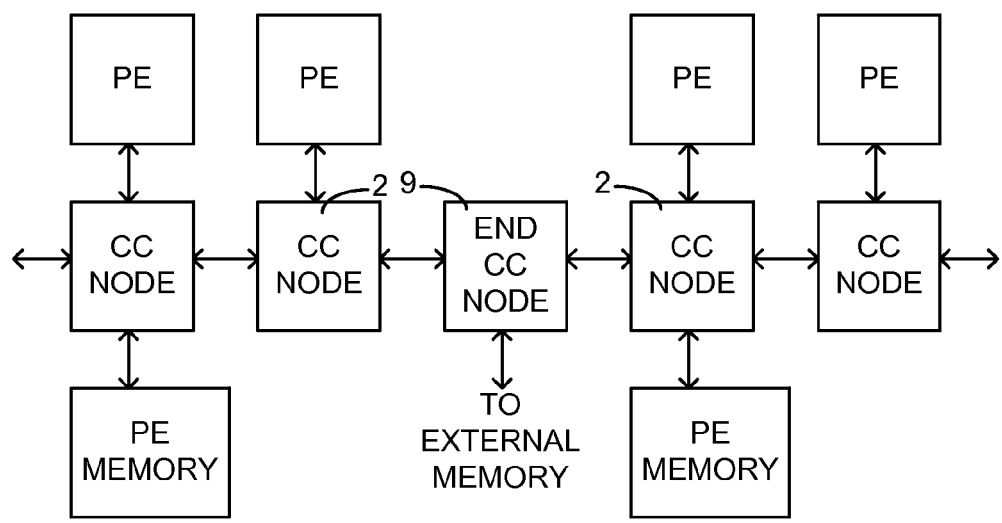
FIG. 9 illustrates an example of the invention using an intermediate end node.

There does not need to be a one-to-one mapping between PEs and memory blocks. As illustrated in FIG. 9, there may be one block of memory shared by multiple PEs, in this case two PEs. This may be desirable as one large block of memory is more efficient in area than multiple small blocks. However, multiple small blocks can provide faster access. The flexibility provided by the invention allows the best trade-off of area and performance.

The so-called "end nodes" such as node 9 in FIG. 9 can be placed anywhere within the array allowing access latency to be optimised. The end nodes are used to interface to external memory or another similar processor. By having two or more such end nodes, multiple processors can be connected to create a multi-processor system. All memories in the system, whether PE memory or external memory, can then be accessed by any PE using a common addressing scheme. In a multi-processor system, the global memory address will be formed by combining, the physical location in the target memory, the PE identification number and the processor identification number.

Some of the blocks of memory attached to the bus can be implemented as a data cache. When the cache has to flush or fetch data, only the SLS unit will stall—the other PE operations can continue to run. A thread switch can be done at this point to ensure the array is kept busy.

In large arrays, the latency for transferring data from one end to the other could be reduced by adding extra connections between nodes. There are various known methods for providing such routing such as grid, tree or hypercube networks.

The addition of redundant CCB nodes, PEs and memories can be used to increase yield. Broken PEs or Memories or both can be skipped by re-assigning the respective address to a nearby node and routing all traffic through the faulty PE's CCB node unmodified.

The SLS (Shared Load/Store Unit)

Currently the standard load/store (LS) unit handles the movement of data between the memory and the register file of each PE under control of an instruction sequence. The LS unit supplies control signals, a register file address and a memory address to all PEs. Further details of our standard load/store controller can be obtained from our UK patent No 2348974.

The shared load/store (SLS) unit is similar in that it is responsible for managing the shared memory transactions. FIG. 10 illustrates schematically how the SLS 10 interacts with the PEs 1 and "bus"/CC nodes 2. Shared Load store controller 10 receives the "transaction enabled" (E) flag values 11 from each PE and the "transaction in progress" (T)-flag values 12 from each bus node 2. It issues control signals (including, memory and register addresses) to all the PEs. In one implementation it also sends memory control signals to the memory blocks 3. In an alternative implementation the memory control signals are generated by each bus node 2. The address used by each memory (and data for writes) comes from the bus node. A chain of OR-gates 13 enables each PE 1 and each Node 2 to communicate their status back to the SLS 10.

The feature that makes the SLS different from the existing load store unit is that the time taken for a shared transaction depends on the distance between the source and destination PEs. This is a variable and possibly unknown value. It can also be different for every PE. Therefore, the time for a shared load or store transaction to complete cannot be known in advance.

A data packet may arrive at one of the memories on each cycle, so one possible implementation is for the SLS unit to send the control signals to perform a memory access (read or write) on every cycle. Only those memories which have received a transaction from the corresponding CC node will actually perform the memory transaction. The advantage of this approach is simplicity; the disadvantage is that the memory writes will be spread out over multiple cycles, potentially interfering with other units accessing the memory. A more efficient approach is for the SLS to wait for all the transaction packets to reach their target memories and then cycle the memory control signals once. Alternatively, a combination of the two approaches can be used, where a certain number of memory accesses are "batched up" and performed simultaneously.

The SLS has to receive information about the global state of the PEs, and the bus nodes to determine if a transaction is taking place or there are pending transactions outstanding. When all PEs taking part in a transaction have been satisfied, the SLS can terminate the shared load/store transaction. This is based on 'transaction enable' flags on every PE and CCB activity flags. This global state is collected through a logic network of arbitrary configuration; potentially being fed back through the bus structure itself or a separate network which OR's the status signals together. Each PE can set a local transaction enable flag to indicate if it wishes to take part in a shared memory transaction.

The SLS unit has to interact with the other control mechanisms within the array controller, such as the register interlocks, other load/store units and semaphore mechanisms in the same way as the standard LS unit. It is possible for the SLS and LS units to be in operation at the same time, arbitrating for access to common resources on a cycle by cycle basis.

In order to control the transactions, the SLS continually sequences the global register file and memory control signals until all transactions have completed.

Typically, the SLS unit provides the register file address for the transaction, the memory address being generated locally at each PE. For some transfers it may be preferable for the PEs to generate the register address locally or for the memory address to be provided by the SLS unit.

Memory addresses can be supplied by the PE using any of the standard addressing modes. These addresses can implicitly address another PE (based on the address mapping described above). Alternatively the programmer may wish to explicitly reference a PE number, in which case the id and memory address are combined locally to form a shared memory address. It is also possible for the SLS to supply a base address or an offset which is added to memory address provided by the PE.

The generated shared memory address is transmitted with the data across the CCB and used to steer the transaction along the CCB to the destination PE. At the destination PE, the memory address field is extracted and used to control the reading or writing of data to memory.

Specific Operations

In this section, some specific operations will now be described.

Shared Writes

Shared writes can use either a 'posted' or non-posted (acknowledged) operation. A posted write means that the PEs do not wait for acknowledgement that the write transaction has completed: once a write transaction has left a PE's transaction buffer, only activity on the CCB indicates its progress. Once all activity on the CCB ceases, all writes have completed.

A posted write will be described in detail. To initiate a write operation, the SLS unit broadcasts a register file address to all PEs. Only transaction-enabled PEs will take part in the write operation. Next, the SLS unit transfers the address and data to be written from each transaction-enabled PE onto the CCB interface. As the CCB 'transaction in progress' signal is activated, the PE is disabled for further transactions.

The CCB steers the packet containing the address and data to the destination PE using id field of the address. This may take a variable number of cycles depending upon the distance the data has to travel across the CCB. The CCB operates autonomously, routing transactions up or down the PE array. It is possible for all PEs to activate transactions at the same time thus fully exploiting the concurrent transfer capability of the CCB.

When the data arrives at its destination it is written to PE memory using the memory address extracted from the packet. On each cycle, a packet could arrive at the destination PE memory, therefore the SLS unit continuously sequences the SRAM controls until all activity on the CCB ceases. It then signals completion of the write to the instruction/thread sequencer unit. If multiple writes to a single PE memory occur, then the order is not guaranteed to be preserved, but the sequencing will still work to completion.

Acknowledged Writes

When a write needs to be acknowledged the operation is similar to a read as described below; the PEs do not turn off their 'transaction enabled' flag when the write data is sent. The source PE id is included in the transaction packet so that a result can be returned. When the data is written into memory a response packet is generated (in the same way as a read response but it contains no data). The PEs turn off the transaction enabled flag once they receive the result packet.

As with shared read transactions, the processor can execute instructions from another thread while waiting for the write to be acknowledged.

Block Writes

It is possible for the PE to generate a sequence of shared writes using a 'block copy' command issued by the SLS. This provides a base register and memory address and a count. Subsequent operations sequence successive register file and successive memory addresses to implement a block operation. Each PE counts the transactions as they are issued and once the number requested have been sent, then the transaction enabled flag is cleared. The SLS sequences until all the writes by all the PEs in the block are complete.

Broadcast Writes

It is also possible to use the shared write mechanism to write the data from a PE to all memories. A special "broadcast" poly shared write transaction is generated from all participating enabled PEs. Each PE can broadcast different data to a different memory address. The CCB detects this mode and at each CCB node it replicates the transaction, copying the packet to the locally attached memory and forwarding it to the next node. Any transactions that reach the end of the CCB are discarded or can be passed on if another processor is attached.

During the operation, the SLS waits until all CCB activity stops to determine that the broadcast has completed. If all PEs are enabled, i.e. all PEs are writing to all memories, then a considerable number of transactions can be generated.

Shared Reads

Shared reads have a two phase, split transaction operation. The read transaction phase generates the requests that make their way to the memories. Once the read transaction arrives, it is reflected back to its source using a return address embedded in the request. Shared read operations therefore take longer than shared write transactions.

To initiate a read operation, the SLS unit broadcasts a register file address to all PEs. Only transaction-enabled PEs will take any part in the activity. Next, the SLS unit transfers the shared memory address, the requesting PE's id, and the destination register address onto the CCB interface from each transaction-enabled PE. The CCB 'transaction in progress' signal is activated. The PE's id and register address are stored in the packet on the bus to be used as a return address for the read data.

The CCB steers the packet to the destination PE using the destination PE id in the shared memory address. This may take a variable number of cycles depending upon the distance the data has to travel along the CCB. The CCB operates autonomously, routing transactions up or down the PE array. It is possible that all PEs can activate transactions thus fully exploiting the concurrent transfer capability of the CCB.

When the packet arrives at the destination PE, the data is read from the memory using the memory address extracted from the packet. The data, the return PE id and register address are loaded into a CCB packet. A return CCB transaction is generated and data is steered back to its source. When the packet arrives back at the originating PE, the data is written to the PE register file using the register address encoded in the packet. The PE is then disabled for further transactions.

The SLS unit continuously sequences the SRAM and register write control signals until all activity on the CCB ceases and all transaction enable flags are off. It then signals completion of the read to the sequencer unit.

If multiple reads from a single PE memory occur, then the order is not guaranteed, but the sequencing will still work to completion.

Broadcast Reads

As with broadcast writes, a single read operation can return data to the same register in all PEs. In this case, each CCB node replicates the data returned from the memory access so it is copied to every PE.

Block Reads

It is possible for the PE to generate a series of shared reads from a block read command given by the SLS. The SLS block command would provide a base register file and memory address and a count. Subsequent operations sequencing successive register file and successive memory addresses for a block operation. The PE sequences until all transactions are complete.

External Transactions

The same basic mechanism can be extended to allow accesses to external memory or between PE arrays in different processors. The external devices are connected via the end nodes (CCBEN) of the bus via suitable interfaces. Addresses that are out of the range for any PE in the array will eventually reach an end node. These accesses can be to memory/processors on the same chip or to off-chip devices.

External Writes

As noted above, shared writes can be posted. This means that if any of the shared writes are addressed such that they are steered to a CCBEN then that transaction effectively disappears from the bus and the SLS can consider the write transaction completed. There is no need for any further feedback concerning its activity once it has left the processor.

However, it may be desired to wait for an acknowledgement of the write in order to synchronize separate processors or ensure data integrity. Acknowledged writes have a two phase split-transaction operation, the write transaction and the acknowledge transaction. The write transaction phase generates write requests that are steered to their destination using the data's address field. Once the write transaction arrives at its destination the receiver generates an acknowledge transaction packet, sent back to its source using a return address field embedded in the request, in this case the sending CCBEN.

The CCBEN accounts for all the transactions that have been converted in this way by counting the transactions as they leave and return. Once all acknowledges have been received a signal is generated for the SLS indicating that all the Acknowledged write transactions have completed. Individual PEs are not involved in this process.

The processor can execute instructions from other threads while waiting for all the writes to be acknowledged.

External Reads

Shared reads have a two phase split-transaction operation.

If a shared read is addressed to an external device via a CCBEN, the SLS unit continues activity as if a normal shared read operation has taken place, except that the transactions that have been sent externally may take many more cycles to complete than the local shared reads. Hence, a number of transaction-enabled flags may not have been deactivated even though there is no more CCB activity. The SLS unit can use this state to indicate to the array controller that a thread switch may now take place.

At some time later one or more return transactions will appear on the CCBEN. This is signaled to the array controller to indicate that a thread switch may be necessary and the state is restored to all the PEs. Once the thread state is restored, the SLS unit can be re-activated and the transaction allowed to proceed. The operations now continue as a normal shared read.

Incoming Transactions

When a transaction arrives at CCBEN from an external source (typically another PE array) the SLS is signaled that a transaction has started. The SLS will generate the necessary control signals to read or write the PE memories addressed by the transaction. Read data return transactions will be generated as described above—the only difference being that their destination will be external to this array. Once all activity on the bus ceases the SLS will stop (there being no transaction enabled PEs).

If an external transaction arrives while a local shared memory access is taking place, then the incoming transaction can be stalled until the local transaction has completed. The same mechanism allows any external device (e.g. a host/debug processor) to access the PE memory.

Conclusion

Whilst the above description has set out the main features of the invention and the claims define the essential elements of the invention, the following list of advantages and features is a helpful summary of the key features that can be achieved by the invention in its preferred form or implementation.

The multi-threaded nature of the MTAP hides the latency of shared load/stores.

Globalisation of PE memory and unified addressing simplifies programming model.

Accesses to all memory types are seamless to the programmer. Thus transparent high bandwidth transactions to bulk on-chip RAM are feasible.

The compiler can be given information about the latencies of various address ranges and transfer types; this will allow the compiler to schedule and optimise data movements (using standard, known techniques).

PE memory can be 'virtualised'—i.e. they can appear to have more memory than is physically present on each PE.

The processor transparently supports accesses between PE arrays in different processors.

Transfers to/from different PEs and memory can occur concurrently on the bus (at different nodes), automatically maximising memory transaction bandwidth.

Allows many-to-one and one-to-many transactions (e.g. broadcast).

Transactions naturally queue on the CCB.

Concurrent shared load/store, 'normal' poly load/store and ALU operations are provided.

Shared transactions can take more cycles than poly and therefore the compiler can schedule them in advance to overlap activity.

More effective partitioning of blocks of memory and allocation to PEs is allowed.

Faulty parts can be repaired by the addition of Redundant PEs mapped in by changing CCB node addressing.

The memory can provide caching.

The invention claimed is:

1. A multiprocessor system, comprising:
 a plurality of processing elements having a corresponding plurality of physical local memories, the plurality of processing elements including a first processing element having a first physical local memory and a first processor, and a second processing element having a second physical local memory;
 a packet-switched interconnection network to receive memory addresses from each of the plurality of processing elements, the interconnection network also to couple each of the plurality of processing elements to a respective corresponding physical local memory for accessing data stored therein, the interconnection network also to couple each of the plurality of processing elements to each of the physical local memories of other of the plurality of processing elements for accessing data stored therein;
 the first processing element to reference a first memory location in the first physical local memory by passing, to the interconnection network, a first global memory address formed by combining the physical location in the first physical local memory, a first identifier associated with the first processing element, and a first processor identifier associated with the first processor;
 the first processing element to reference a second memory location in the second physical local memory by passing, to the interconnection network, a second global memory address formed by combining, in the same manner as the first global memory address was formed, the physical location in the second physical local memory, a second identifier associated with the second processing element, and the first processor identifier.

2. The multiprocessor system of claim 1, wherein a first range of addresses passed to the interconnection network by each of the plurality of processing elements is referencing memory locations in the physical local memory of the respective processing element.

3. The multiprocessor system of claim 2, wherein a second range of addresses passed to the interconnection network by each of the plurality of processing elements is referencing memory locations in the physical local memory of a different processing element.

4. The multiprocessor system of claim 3, wherein the first range of addresses and the second range of addresses are contiguous.

5. The multiprocessor system of claim 1, wherein the second processing element includes a second processor.

6. The multiprocessor system of claim 3, wherein a third range of addresses between the first range of addresses and the second range of addresses reference to an external shared memory.

7. A method of accessing local memories in a multiprocessor system having an interconnection network, comprising:
 referencing, by a plurality of processing elements that include a corresponding plurality of physical local memories, memory locations by passing global memory addresses to the interconnection network, the global memory addresses formed by combining a physical location in a physical local memory, an identifier associated with a processing element that includes the physical local memory, and a processor identifier associated with a processor;
 receiving global memory addresses from each of the plurality of processing elements;
 based on a first plurality of global memory addresses that include an identifier associated with a processing element that is making the access, coupling each of the plurality of processing elements to a respective corresponding physical local memory of the processing element making the access for accessing data stored therein; and,
 based on a second plurality of global memory addresses that include identifiers associated with processing elements that are not making the access, coupling each of the plurality of processing elements to each of the physical local memories of processing elements that are not making the access for accessing data stored therein.

8. The method of claim 7, wherein the interconnect network includes and an end node coupled to an external memory.

9. The method of claim 8, wherein the external memory comprises non-local shared memory.

10. The method of claim 7, wherein a first range of addresses passed to the interconnection network by each of the plurality of processing elements references memory locations in the physical local memory of the respective processing element.

11. The method of claim 10, wherein a second range of addresses passed to the interconnection network by each of the plurality of processing elements references memory locations in the physical local memory of a different processing element.

12. The method of claim 11, wherein the first range of addresses and the second range of addresses are contiguous.

13. The method of claim 11 wherein the first range of addresses and the second range of addresses are non-contiguous.

14. The method of claim 11, wherein a third range of addresses between the first range of addresses and the second range of addresses reference to an external shared memory.

15. A packet-switched interconnection network, comprising:
 a first at least one interface to a plurality of processing elements having a corresponding plurality of physical local memories, the plurality of processing elements including a first processing element having a first physical local memory and a first processor, and a second processing element having a second physical local memory, the interconnection network also to couple each of the plurality of processing elements to a respective corresponding physical local memory for accessing data stored therein, the interconnection network also to couple each of the plurality of processing elements to each of the physical local memories of other of the plurality of processing elements for accessing data stored therein;

the first processing element to reference a first memory location in the first physical local memory by passing, to the first at least one interface, a first global memory address formed by combining the physical location in the first physical local memory, a first identifier associated with the first processing element, and a first processor identifier associated with the first processor;

the first processing element to reference a second memory location in the second physical local memory by passing, to the first at least one interface, a second global memory address formed by combining, in the same manner as the first global memory address was formed, the physical location in the second physical local memory, a second identifier associated with the second processing element, and the first processor identifier; and, a second at least one interface to couple the interconnection network to an external memory.

16. The interconnection network of claim 15, wherein a first range of addresses passed to the interconnection network by each of the plurality of processing elements is to reference memory locations in the physical local memory of the respective processing element.

17. The interconnection network of claim 16, wherein a second range of addresses passed to the interconnection network by each of the plurality of processing elements is to reference memory locations in the physical local memory of a different processing element.

18. The interconnection network of claim 17, wherein the first range of addresses and the second range of addresses are contiguous.

19. The interconnection network of claim 17, wherein the first range of addresses and the second range of addresses are non-contiguous.

20. The interconnection network of claim 17, wherein a third range of addresses between the first range of addresses and the second range of addresses reference to an external shared memory.

* * * * *